Oct. 4, 1966

H. G. PARKE 3,277,483

RADIO NAVIGATION SYSTEM PROVIDING A CONSTANT PHASE
REFERENCE SIGNAL AT ANY POINT ON EARTH

Filed Sept. 8, 1965

INVENTOR.
HARRY G. PARKE

BY *Imirie and Smiley*

ATTORNEYS

Oct. 4, 1966  H. G. PARKE  3,277,483
RADIO NAVIGATION SYSTEM PROVIDING A CONSTANT PHASE
REFERENCE SIGNAL AT ANY POINT ON EARTH
Filed Sept. 8, 1965
4 Sheets-Sheet 2
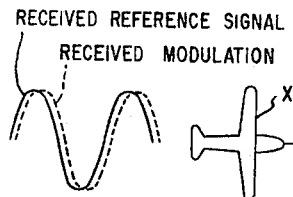
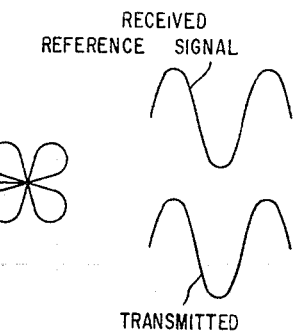
FIG.3
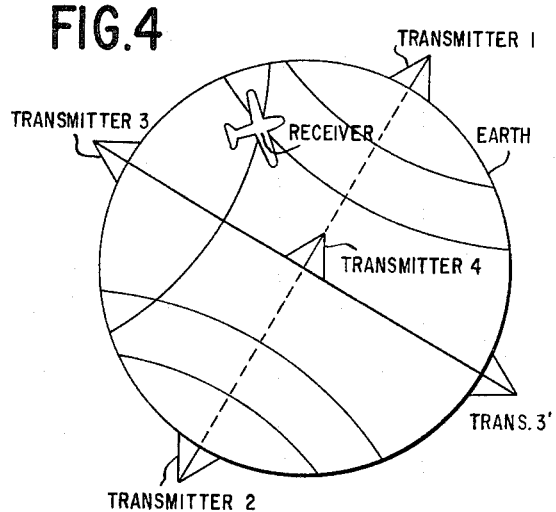
FIG.4
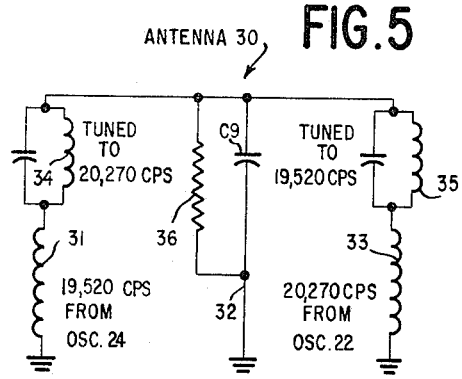
FIG.5
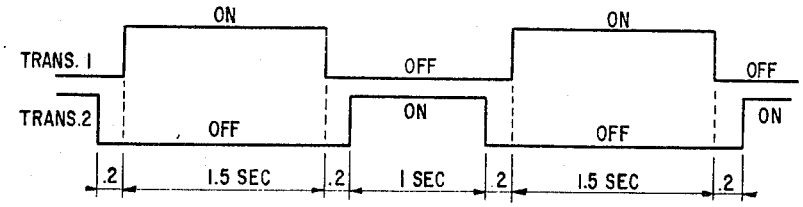
FIG.6
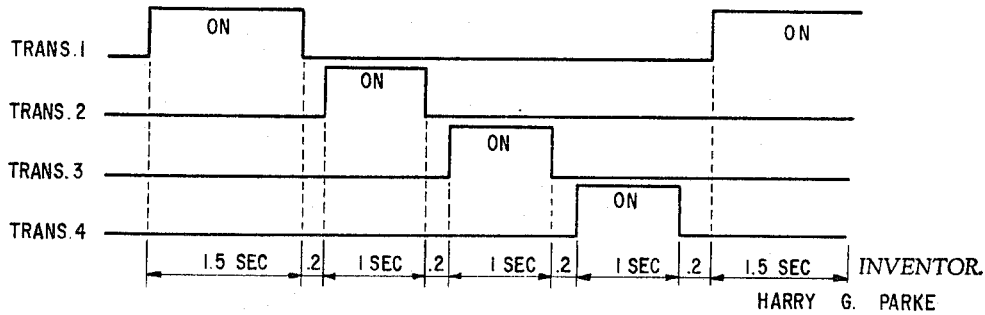
FIG.10
INVENTOR.
HARRY G. PARKE
BY
*Imirie and Smiley*
ATTORNEYS.

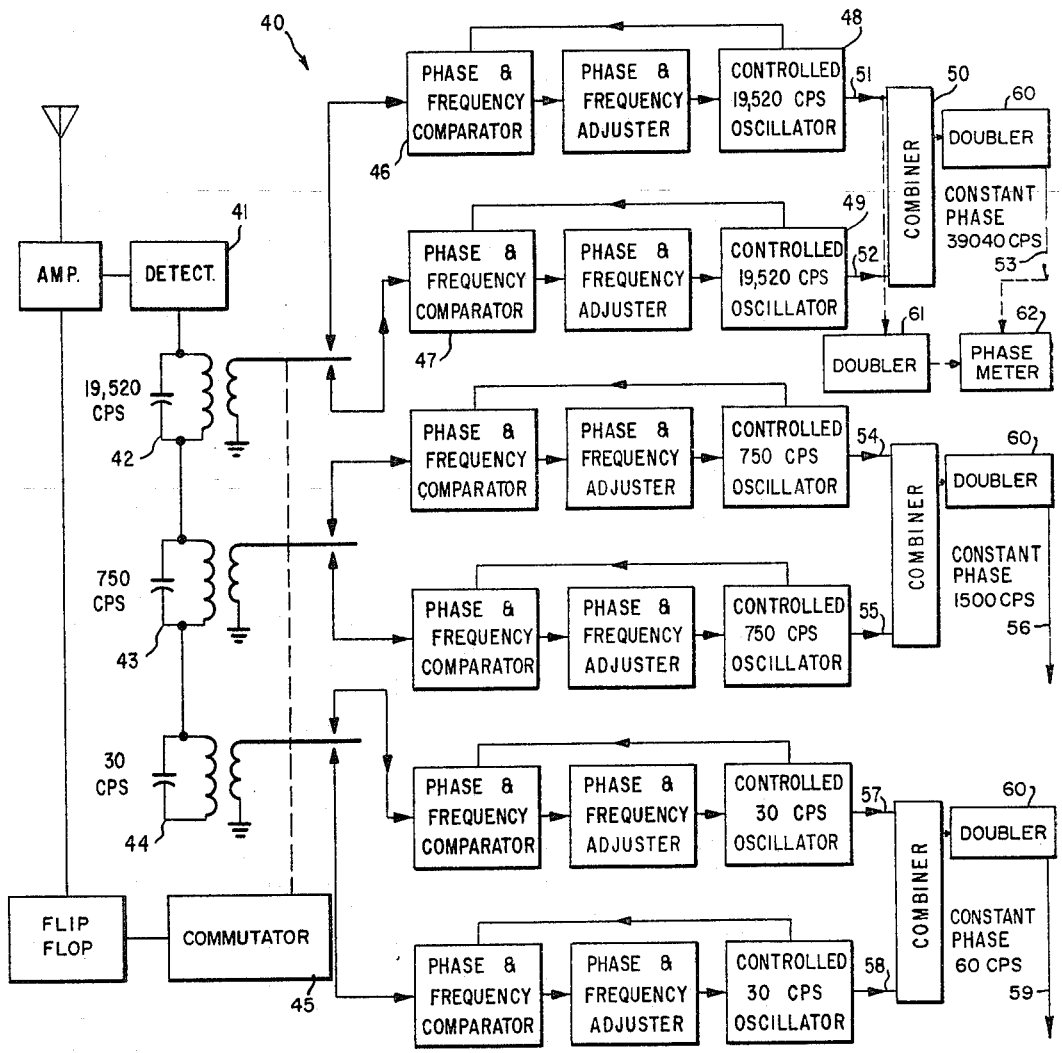
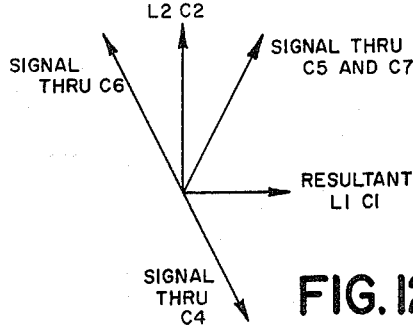
FIG. 7 RECEIVER APPARATUS FOR CONSTANT PHASE
FIG. 12

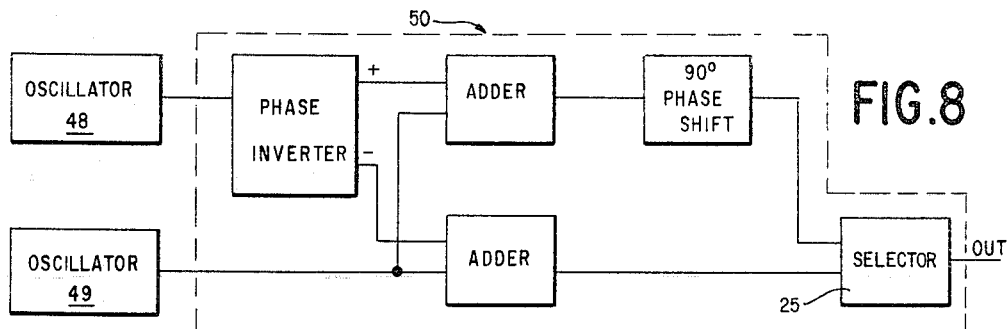
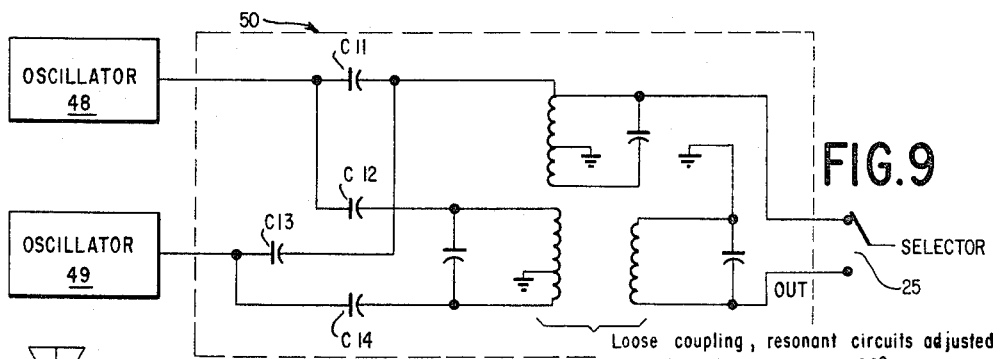
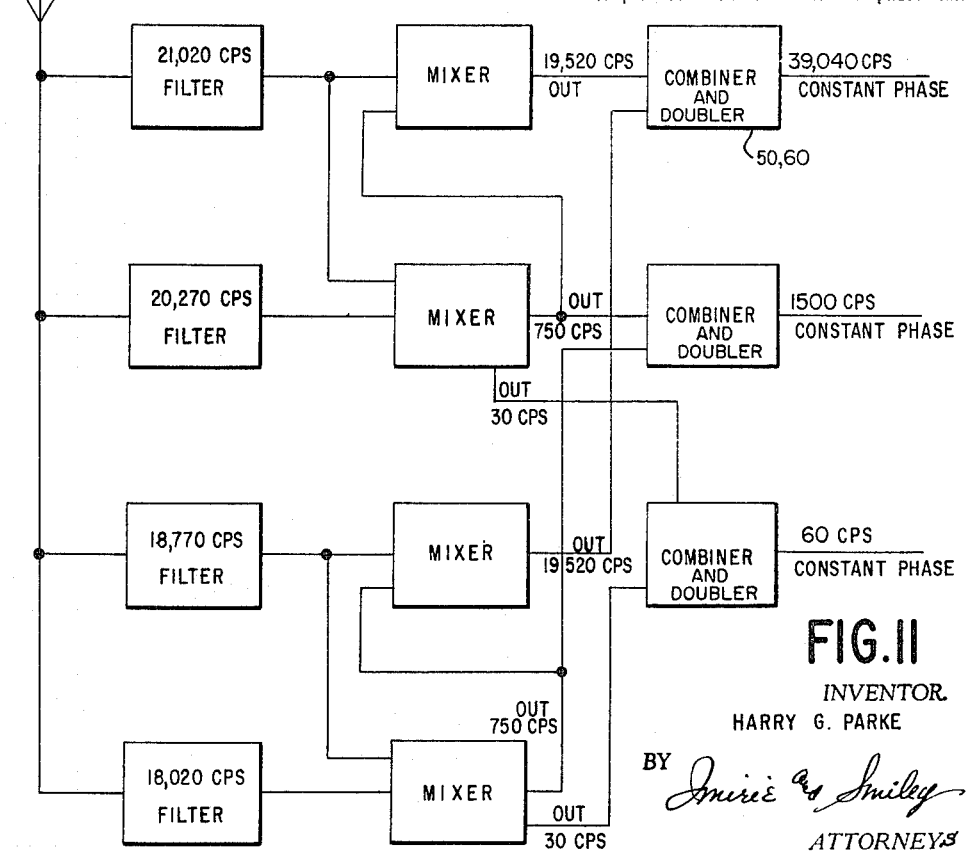

United States Patent Office 3,277,483
Patented Oct. 4, 1966

3,277,483
RADIO NAVIGATION SYSTEM PROVIDING A CONSTANT PHASE REFERENCE SIGNAL AT ANY POINT ON EARTH
Harry G. Parke, Brooklyn, N.Y., assignor to Marine Electric Corporation, Brooklyn, N.Y., a corporation of New York
Filed Sept. 8, 1965, Ser. No. 491,480
16 Claims. (Cl. 343—105)

The present application is a continuation-in-part of application Serial No. 196,678, filed May 22, 1962, now abandoned.

This invention relates to a radio navigation system and more particularly to a radio system for determining the position with respect to a fixed station of some moving object such as for example an airplane or a ship.

The expanding problems of air traffic require an additional radio navigation, or location, system independent of and based on different principles than the present angle measuring systems such as VHF Omni Range Equipment (VOR) and Tactical Air Navigation (TACAN).

It is a primary object of the present invention to provide such an independent system.

A distance measuring principle is desirable, but all present day systems are active, requiring an interrogator on the plane and a responder at the point from which distance is being measured. This requires heavy and expensive equipment in each plane and leads to the probability of saturation and interference difficulties with increasing numbers of users.

To avoid these problems it has ben suggested that planes carry an ultra-stable oscillator, synchronized with the frequencies transmitted from present or new radio aids. This system would have many advantages. Unfortunately in order to retain good accuracies at the landing end of a long flight, stabilities of about $10^{-10}$ parts per hour are required.

While such stabilities may be obtained in laboratory equipment, adaptation to aircraft equipment is not likely to be simple, nor is it likely to result in a light or economical device, while pre-flight check outs of stability would be difficult indeed. One of the major problems is that any distance error produced by the plane's oscillator drift is independent of distance from the reference point. Thus a two mile error, which would be insignificant for a plane six hundred miles from its destination, might be catastrophic one mile from landing.

This invention as a further object seeks to attain the advantages of the ultra stable oscillator system without the use of the flying oscillators. To attain this object, it will be shown in the following description that it is possible, through the use of two VLF transmitters, to generate a composite signal whose phase will be constant, independent of position, over very large areas, in principle over the entire surface of the earth. This signal may be used to synchronize the audio frequencies of all types of existing radio aids and can also be detected by properly equipped aircraft in flight. It would, therefore, be practical for a comparatively simple equipment on the plane to determine the plane's distance from each such radio aid by a simple phase comparison of the received signals.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a diagram illustrating the principle of the invention through the use of two master stations properly located;

FIG. 2 is a block diagram, partly schematic, of a receiver apparatus usable on a moving station, or elsewhere, to combine the master station signals into a composite constant phase signal;

FIG. 3 is a diagram illustrating application of the principle of the invention to determination of the distance between an aircraft and a radio aid such as a VOR station;

FIG. 4 is a diagram similar to FIG. 1 illustrating the use of more than two master stations;

FIG. 5 is a schematic diagram of an antenna usable at a fixed station for radiating energy embodying two carrier frequencies;

FIG. 6 is a diagram showing a possible time separated operation of two master stations;

FIG. 7 is a block diagram of part of receiving apparatus usable to combine signals, from master stations operating at separate time intervals per FIG. 6, into a constant phase reference signal;

FIG. 8 is a block diagram of one of the combiners in FIG. 7;

FIG. 9 is a circuit diagram of the combiner of FIG. 8;

FIG. 10 is a diagram similar to FIG. 6 showing time separated operation for four master stations;

FIG. 11 is a block diagram of receiving apparatus usable to combine signals from master stations operating simultaneously on different but related frequencies; and FIG. 12 is a vector diagram illustrating the signals in the tuned circuits of FIG. 2 and their resultants.

Referring now to the drawing, FIG. 1 illustrates the basic principle of the invention. Two VLF transmitter antennas 1 and 2 are located on opposite ends of a diameter 3 of the earth. Obviously for an aircraft X, or ship, at any point on the surface of the earth, the sum of the great circle distances to the two antennas $(d_1+d_2)$ is constant independent of position. If the two transmitters are frequency and phase synchronized, by making one slave to the other; are prevented from interfering with each other, by having the transmissions on different but harmonically related frequencies; and if round trip interference is prevented, by making all transmitted and modulation frequencies harmonics of the frequency whose wavelength is half the earth's circumference, that is of approximately 15 c.p.s., then a receiver device carried by the aircraft and of the type shown schematically in FIG. 2 will generate an output frequency whose phase is independent of position for any point on earth. The two transmitters are frequency and phase synchronized by any known, or conventional, method. For example, the signal from the master station may be received through a radio antenna at the slave station and the common harmonics of both stations applied to a phase discriminator. The direct current output of the discriminator may then be applied to a reactor tube to correct the phase of the slave station as described in connection with the Decca system in Electric Avigation Engineering (EAE) by Peter C. Sandretto, published by International Telephone and Telegraph Corporation in 1958, see page 168, lines 27–30. While Decca uses higher frequencies than the present invention, synchronizing to a radio received signal is performed at very low frequencies in the Delrac system (EAE pages 174–177) and the Omega system (EAE pages 179–181).

The frequencies and circuit arrangements of the receiver apparatus shown in FIG. 2 illustrate one practical system, there being other and preferred means of accomplishing the same ends. These preferred means are illustrated in FIGS. 7 and 11. Assume that one fixed station transmitter at one end of an earth diameter operates at 4980 c.p.s., amplitude modulated at 30 c.p.s.; the other at the other end of the earth diameter operates at 9960 c.p.s., amplitude modulated at 30 c.p.s. The upper part of FIG. 2 shows the signals being received on antennas 5 and 6, amplified in amplifiers 7 and 8, limited to the same level in each channel and converted to trains of very short pulses by 10 and 11 and applied through capacitors C4, C5, C6 and C7 to tuned circuits L1C1 and L2C2, both of which are tuned to 9960 c.p.s. The 4980 c.p.s. signal is applied through C5 and C7 in the same phase to both tuned circuits but because of the action of phase splitter 18 the 9960 c.p.s. signal is applied through C6 to C2L2 180° out of phase though of the same amplitude as the 9960 c.p.s. signal applied through C4 to C1L1. Since for short pulses the second harmonic and fundamental have equal amplitudes, both circuits C1L1 and C2L2 will be excited equally by the 9960 components of the 4980 and 9960 c.p.s. signals. As explained above, any change in the time delay of the 4980 c.p.s. signal will be equal and opposite to the time delay change of the 9960 c.p.s. signal. Consequently referring to FIG. 12, the vector representing the signal through C6 and the vector representing the signal through C7 will always have their resultants along the same line. Similarly, the resultants of signals through C4 and C5 will be along another line. It can obviously be seen from the vector diagram that these two resultants are always at right angles to one another and that they can never vanish simultaneously. Inductive coupling is used between L2 and L3 together with resonant circuit L3C3 so as to cause a 90° phase shift in the resultant from L2C2 and bring both resultants into phase. Since both resultants will not vanish simultaneously a selector 25 can always select a constant phase reference by choosing the stronger of the two signals. In FIG. 2, C1, C2 and C3 are equal, as are L1, L2 and L3. C4 equals C6, C5 equals C7, and C5 equals twice C4 and is very much less than C1.

It will be clear from a study of FIG. 12 that as the signal on L2C2 passes through null it reverses in phase, as does the signal on L3C3. Therefore the input to amplifier 20 also is not strictly constant in phase since it may have one of two phases 180° apart.

To have a truly constant phase output, amplifier 20 is a frequency doubling amplifier, one of the several known types, for example; a tuned Class C amplifier, or a linear amplifier followed by a full wave rectifier, whose output is unaffected by a 180° phase shift of its input.

A very similar technique is shown in the lower portion of FIG. 2 to generate a constant phase 60 c.p.s. signal for coarse reference, the modulations of the 4980 and 9960 c.p.s. signals being detected respectively at 12 and 13, amplified at 14 and 15, split at 19 and thereafter fed through pulse generators 16 and 17 to tuned circuits L1C1 and L2C2 corresponding to those of the upper portion of FIG. 2.

A device such as that shown in FIG. 2 can also be used to synchronize the 9960 c.p.s. and 30 c.p.s. reference signals at VOR installations such as 21, FIG. 3, and the 90, 150, and 1020 c.p.s. frequencies at four course radio ranges or similar radio aids. Similar equipment can be carried aboard the plane X, FIG. 3, and well-known techniques used to compare the phase of the audio outputs from the device described on the plane with the phase of the signal received from the synchronized radio aid, thereby directly indicating the distance between the plane and the radio aid. An aircraft carrying the device of FIG. 2 can thus determine its distance either from one of the antennas 1 or 2, FIG. 1, or from VOR station 21, FIG. 3.

In this connection it should be noted that the generation of a signal whose phase is independent of position is not dependent upon any particular phase relationship between the master and slave station.

The phase relationship between the two stations must be known for the use of the system in long distance navigation but for passive distance measuring to VOR or other raido aids all measurements are of differences between the phase of the VLF composite signal and the signal received from the radio aid to navigation. Accordingly, phase synchronization is not essential. Were the slave station to drift in phase away from the master, it would affect the fields at all points of the earth equally and therefore no error would be introduced in the difference measurements.

Propagation anomalies such as the difference between land and water paths, presence of mountain ranges, etc., may cause some minor variation from great circle radiation routes and hence the reference phases produced may not be entirely constant over the entire earth. However, any anomalies that affect a radio aid will also affect all planes in its vicinity; hence any distance reading error from this cause will vanish with decreasing range, in contrast to the condition with an ultra-stable oscillator.

While two very large transmitting stations would be needed at 1 and 2, FIG. 1, they would not have to be as large as the million watt Navy Department stations at Jim Creek, Washington and Cutler, Maine; the usefulness of present radio aids could be greatly extended at very moderate cost and plane equipment should be much cheaper than any known alternative. Thus overall costs should be low, particularly in view of the system's freedom from saturation.

The utility of the constant phase reference signal achieved in FIG. 2 may be realized by considering that it is equivalent or superior to having on every equipped ship, plane, or land station a super precision, perfectly synchronized oscillator clock. The described reference signal makes possible a completely passive distance measuring system as shown in FIGS. 1–3. A ground radio aid, for example a VOR, transmits its modulation in synchronism with the received VLF reference signal. An approaching plane receives both the VOR transmission and the VLF reference, the time displacement between them gives the distance from the VOR immediately. Such a passive system has enormous advantages over the present active systems. The ship or plane equipment is simple, lighter, cheaper, require less maintenance and is of utility for long distance navigation as well; spectrum space is conserved; an unlimited number of moving stations can determine their distance from a point without mutual interference; and the use of this system does not reveal the locations or existence of the moving stations to outside observers. Furthermore, accuracies comparable to present systems at short ranges and considerably better at longer ranges are readily attainable.

A constant phase, composite, reference signal also simplifies the long distance navigation problem. Distance can be determined from a VLF station 1 or 2 by comparison to the constant phase reference signal in precisely the way described above. One of these stations can be one of the two used for generating the reference signal, a third VLF station, see FIG. 4, can be synchronized to the common reference. A quasi-latitude can, therefore, be determined from two different axes and a world wide radio location system obtained with only three transmitting stations. To ensure reasonable orthogonality of fix intersections it will probably be desirable to use four stations as illustrated by stations 1, 2, 3 or 3' and 4, FIG. 4.

To keep the transmission from one VLF fixed station from interfering with that from the other, two possibilities are available. One involves frequency separation as described above, and the other involves time separation. For the time separation technique, the transmissions from each station can be identical in frequency and may consist, for example, of a 19,520 c.p.s. carrier, and a 20,270 c.p.s. carrier, either or both amplitude modulated at 30 c.p.s.

Because of the low radiation resistance and hence high loaded Q's at VLF it would of course be impossible to have a 750 cycle bandwidth from a practical transmitting aerial. There is, however, no need to have this; all that is needed is an antenna that is tuned at both 19,520 and 20,270 c.p.s. which is a quite practical thing to do. One simple way of accomplishing it is shown in FIG. 5 in which each fixed station is provided with an antenna 30 having parallel branches 31, 32, 33. Branch 31 includes a circuit 34 resonant to 20,270 c.p.s. and receives the 19,520 c.p.s. signal from an oscillator 24. Branch 33 includes a circuit 35 resonant to 19,520 c.p.s. and receives the 20,270 c.p.s. signal from an oscillator 22. Branch 32 includes a radiation and loss resistor 36 in parallel with a capacitor C9.

Each fixed station would include the oscillators 24, 22. One fixed station would be a master station, the other a slave. A receiver, associated with the slave station would receive both the master and slave transmissions and would drive a servo-mechanism to correct the slave oscillator in phase and frequency to maintain perfect synchronism with the master. The synchronizing receiver would preferably be located about half way between the master and slave transmitters. It has been demonstrated (W. F. Blackburne "Effects of the Ionosphere on VLF Navigational Aids," N.B.S. Journal of Research, vol 65D, No. 6, Nov.–Dec. '61) that precision synchronism to VLF transmissions from over 5,000 nautical miles away is practical. If the controlled slave oscillator had the readily obtainable stability of $10^{-10}$ parts per hour drift would not exceed about 2.6° per hour, therefore synchronism could readily be maintained over phone lines or other low frequency link. If necessary a chain of relay synchronizing stations may be established, each station located less than 5,000 miles from the next. The necessary techniques are well known and have often been used in the past, see above description with respect to Decca, Delrac, and Omega systems.

A suitable operating program is shown in FIG. 6. The master station 1 transmits for 1.5 seconds, there then follows a period of 0.2 second during which neither station transmits, the slave station 2 then transmits for 1.0 second, and another 0.2 second period of no transmission by either station completes the cycle. Thus the master station is on for 1.5 seconds and off for 1.4 seconds alternately while the slave station is alternately on for 1.0 second and off for 1.9 seconds. The difference in transmission periods may be used to identify the signals at a receiver.

FIG. 7 is a block diagram of part of a receiving apparatus 40 used to receive signals from a master station operating with the FIG. 5 antenna and to generate the phase invariant reference frequencies at the mobile station. The output from the detector 41 will contain 19,520 c.p.s., one of the transmitted frequencies, 750 c.p.s., the difference between the two transmitted frequencies, and 30 c.p.s. the modulation frequency. These frequencies are readily separated by suitable filters 42, 43 and 44 as shown connected in series with the detector. For simplicity the 19,520 c.p.s. frequency only will now be discussed, the 750 c.p.s. and 30 c.p.s. frequencies are treated in exactly the same way.

The 19.52 kc. output from the detector is alternately switched by commutator 45 to two phase and frequency discriminators 46, 47, the other input of each discriminator coming from a 19.52 kc. oscillator, servo controlled in frequency and phase by the discriminator output. The switching back and forth is controlled by the commutator multivibrator switching during the time of no transmission so that the received signal from transmitter 1 goes to discriminator 46, that from transmitter 2 to the discriminator 47. The result is that one 19.52 kc. oscillator 48 is maintained in phase synchronization with the received signal from transmitter 1, the other oscillator 49 is synchronized with the received signal from transmitter 2.

It now remains to combine the oscillator outputs in such a way as to obtain a phase invariant output. The amplitudes of the oscillators must of course be held constant and equal; assuming this is done, a simple addition of the outputs would result in a phase invariant result. Unfortunately the amplitude of the sum would vary widely, passing through zero when the two signals were 180° out of phase. Therefore, the combiner 50 must have a circuit similar to that shown in FIGS. 8 and 9, including capacitors C11–C14. FIG. 8 is a block diagram while FIG. 9 schematically shows one way of realizing the circuit. It can readily be shown that the combiner output has except for a 180° ambiguity the same phase as a simple adder would produce (and therefore a constant phase, the signals having originated from fixed stations separated by a diameter of the earth). A frequency doubling output from doubler 60 eliminates the 180° ambiguity, as already discussed in connection with FIG. 2.

The 750 c.p.s. and 30 c.p.s. frequencies received in the apparatus of FIG. 7 are treated in exactly the same way. The 39,040, 1500, and 60 c.p.s. frequencies at the points marked "constant phase" in FIG. 7 will be truly that frequencies that have the phase of the original transmission, regardless of receiver position, anywhere on earth.

Instead of having the transmitters transmitting alternately on the same frequencies it would be possible to have them transmitting simultaneously on different, but related frequencies. For example, one transmitter could have 21,020 c.p.s. and 20,270 c.p.s. carriers with 30 c.p.s. modulation, and the other 18,770 and 18,020 c.p.s. carriers with 30 c.p.s. modulation. All frequencies must, of course, be synchronized. Then receiving apparatus, such as that in FIG. 11 could be used to generate the constant phase outputs. As with the circuitry of FIG. 7 the outputs in FIG. 11 will have a phase independent of the receiver position, and free of 180° ambiguity when doublers 60 are added to the combiners 50.

The choice between simultaneous and alternate transmissions must be made on the basis of a careful engineering study. It seems clear that the use of identical frequencies from the two transmitting stations will eliminate differences in propagation velocity with frequency, and that this consideration, plus considerations of ease of receiving antenna design and of spectrum conservation may make the system of FIG. 7 preferable to that of FIG. 11.

Referring again to FIG. 7, by connecting a doubler 61 to any of the lines 51, 54 and 57 and comparing the phases at points 51 and 53, or at points 54 and 56, or at points 57 and 59, using a phasemeter 62 for example connected across the outputs of the doublers 60 and 61, the distance of the receiver from transmitter 1 may be obtained directly. The three comparisons are made to give fine and coarse readings. The time difference is the same for all three (3) frequencies and any one of the measurements contains the information, but the resultant phase displacement is proportional to frequency and measurements may be more easily made to high accuracy on the higher frequencies. The phase comparison apparatus used is not a novel feature of the invention. Many conventional types of phase indicators may be used, one satisfactory type is that Decca illustrated on page 170 of EAE, referenced above. Such a device is shown diagrammatically as Phase Meter 62 in FIG. 7 upon which phase difference, or distance, may be directly read. One of the phase comparisons described above effectively determines a quasi-latitude of the receiver, as shown in FIG. 4. If a third transmitter, transmitter 3, preferably located midway between transmitters 1 and 2 is synchronized by the composite signal derived from them a similar phase comparison will give the distance from transmitter 3, the intersection of the two quasi-latitude circles so derived will give a fix for the receiver location.

For receiver locations located near the great circle through transmitters 1, 2 and 3 the quasi-latitude circles will intersect at small angles and hence the fix will not be accurately determined. It would be desirable therefore to have a fourth transmitter, as shown in FIG. 4, preferably also midway between transmitters 1 and 2 and 90° from transmitter 3, also synchronized with the composite signal. Then either transmitter 3 or 4 could be used, whichever would give the better fix. A scheme of alternate transmission, such as that shown in FIG. 10 could be used.

In the above described systems the distance error is a percent of the separation between the receiver and the radio aid and is a most important characteristic of distance measurement in the present invention. Clearly as the mobile receiver approaches the radio aid both VLF receivers will be sampling the same field, and hence as the distance between them approaches zero so also do propagation errors. Thus accuracy is highest when it is most needed, near touchdown for an airplane at the end of a flight. This is in contrast to the ultra-stable oscillator system where just the opposite holds. The stable oscillator DME is a semi-dead reckoning system with errors proportional to time of flight, and maximum error when it is most dangerous, at touchdown.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A method of determining the distance of a moving station from a fixed point comprising the steps of transmitting a pair of synchronized signals of very low frequency from a pair of fixed stations located at the opposite ends of a diameter of the earth, receiving both said signals at the moving station, combining the received signals to yield a constant phase composite signal, simultaneously transmitting a signal from said fixed point synchronized with said pair of signals from the fixed stations, and comparing the phase of said composite signal with the phase of said signal transmitted from the fixed point to produce an indication of the distance between the fixed point and the moving station.

2. A method of determining the distance of a moving station from a fixed point comprising the steps of transmitting a pair of synchronized signals of very low frequency from a pair of fixed stations located substantially at the opposite ends of a diameter of the earth, receiving both said signals at the moving station, converting the received signals to a constant phase composite signal, and comparing the phase of said composite signal with the phase of the signal transmitted from one of said pair of fixed stations to produce an indication of the distance between the corresponding fixed station and the moving station.

3. A method of determining the distance of a moving station from a fixed point comprising the steps of transmitting a pair of synchronized signals from a pair of fixed stations located substantially at the opposite ends of a diameter of the earth, receiving both said signals at the moving station, combining the received signals into a constant phase composite signal, and comparing the phase of said composite signal with the phase of the signal transmitted from one of said pair of fixed stations to produce an indication of the distance between the corresponding fixed station and the moving station.

4. A method of determining the distance of a moving station from a fixed point comprising the steps of transmitting a pair of synchronized signals from a pair of fixed stations located substantially at opposite ends of a diameter of a great circle of the earth, receiving both said signals at the moving station, combining the received signals into a constant phase composite signal, and comparing the phase of said composite signal with the phase of the signal transmitted from one of said pair of fixed stations to produce an indication of the distance between the corresponding fixed station and the moving station.

5. In a radio location system a moving station and two fixed stations at opposite ends of a diameter of the earth, means for radiating a pair of synchronized signals of very low frequency from said fixed stations, means on the moving station for receiving and combining said pair of signals into a composite signal of constant phase, and means on the moving station for comparing the phase of the composite signal with the phase of one of said pair of signals to determine the distance between the moving station and the corresponding fixed station.

6. In a radio location system, a moving station, a plurality of fixed stations, means for radiating a pair of synchronized signals from a pair of said fixed stations located at substantially the ends of a diameter of the earth, means for radiating a signal from a third fixed station synchronized with said pair of signals, means on the moving station for receiving and combining said pair of signals into a composite signal of constant phase, and means on the moving station for comparing the phase of the composite signal with the phase of the signal radiated by said third fixed station to determine the distance between the moving station and the third fixed station.

7. In a radio location system, the combination set forth in claim 6 wherein said pair of synchronized signals are in the very low frequency range.

8. In a radio location system, the combination set forth in claim 7 wherein said pair of synchronized signals of very low frequency are harmonics of a frequency whose wave length approximately equals one half of the circumference of the earth.

9. In a radio location system, the combination set forth in claim 7 wherein said means for radiating a pair of synchronized signals comprises means for cyclically separating said pair of signals by transmission in different time periods within each cycle.

10. In a radio location system, the combination set forth in claim 9 wherein said means for receiving and combining the pair of signals comprises a pair of circuits, means for substantially equalizing the amplitudes of signals in said pair of circuits, a phase splitter in one of said circuits, means for independently adding the phase split signals to the signal in said other circuit, means for shifting one of the sum signals 90° in phase and means for selecting the stronger of the two sum signals, said pair of circuits each including an oscillator controlled in frequency by the signal from one of said fixed stations and commutator switching means for switching the received signals from one to the other of said pair of circuits during the periods of each cycle when the fixed stations are not broadcasting.

11. In a radio location system, the combination set forth in claim 7 wherein said means for radiating a pair of synchronized signals includes means for simultaneously radiating signals of different frequency harmonically related.

12. In a radio location system, the combination set forth in claim 7 wherein said means for receiving and combining the pair of signals comprises a pair of circuits, means in both said circuits for limiting the amplitudes of the received signals, a phase splitter in one of said circuits, means for independently adding the phase split signals to the signal in said other circuit, means for shifting one of the sum signals 90° in phase, means for selecting the stronger of the two sum signals, and means for doubling the frequency of the selected stronger signal.

13. In a radio location system, the combination set forth in claim 7 wherein said means for receiving and combining the pair of signals comprises a pair of circuits, means for substantially equalizing the amplitudes of signals in said pair of circuits, a phase splitter in one of said circuits, means for independently adding the phase split signals to the signal in said other circuit, means for shifting one of the sum signals 90° in phase, and means for selecting the stronger of the two sum signals.

14. In a radio location system, the combination set forth in claim 7 wherein said means for radiating a pair of synchronized signals includes means at each station for radiating a signal comprising a pair of different harmonically related carriers each modulated by a very low frequency wave.

15. Apparatus for obtaining a constant phase reference signal at any point on earth comprising means for radiating a pair of synchronized very low frequency signals from points spaced at opposite ends of a diameter of the earth and means for receiving and adding said pair of signals.

16. Apparatus according to claim 15 wherein is additionally provided means for doubling the frequency of said added pair of signals whereby to eliminate 180° ambiguity.

References Cited by the Examiner
UNITED STATES PATENTS

| | | | |
|---|---|---|---|
| 2,430,244 | 11/1947 | O'Brien | 343—105 |
| 2,513,315 | 7/1950 | Hawkins | 343—105 |
| 2,651,032 | 9/1953 | Torcheux et al. | 343—105 |
| 3,111,670 | 11/1963 | Gandillere | 343—112 |

CHESTER L. JUSTUS, *Primary Examiner.*

H. C. WAMSLEY, *Assistant Examiner.*